United States Patent
Ishii et al.

(10) Patent No.: US 7,109,438 B2
(45) Date of Patent: Sep. 19, 2006

(54) POWER SUPPLY APPARATUS FOR ARC-UTILIZING APPARATUS

(75) Inventors: Hideo Ishii, Osaka (JP); Tetsuro Ikeda, Osaka (JP); Kenzo Danjo, Osaka (JP); Yuji Ikejiri, Osaka (JP)

(73) Assignee: Sansha Electric Manufacturing Company, Limited, Osaka (JP)

( * ) Notice: Subject to any disclaimer, the term of this patent is extended or adjusted under 35 U.S.C. 154(b) by 253 days.

(21) Appl. No.: 10/862,105

(22) Filed: Jun. 4, 2004

(65) Prior Publication Data

US 2004/0246755 A1     Dec. 9, 2004

(30) Foreign Application Priority Data

Jun. 6, 2003  (JP) ............................. 2003-162775

(51) Int. Cl.
  *B23K 9/10*  (2006.01)
  *H02M 3/24*  (2006.01)
  *H02H 7/10*  (2006.01)

(52) U.S. Cl. ............................. 219/130.21; 219/130.1; 363/97

(58) Field of Classification Search .................. 363/16, 363/17, 65, 71, 97, 98, 131, 132, 142, 143; 219/130.1, 130.21, 130.31, 130.32, 130.33, 219/137 PS
  See application file for complete search history.

(56) References Cited

U.S. PATENT DOCUMENTS 5,310,992 A * 5/1994 Karino et al. .......... 219/130.21
5,930,122 A * 7/1999 Moriguchi et al. ............ 363/17
6,054,674 A * 4/2000 Moriguchi et al. ..... 219/130.21
6,091,049 A * 7/2000 Ikeda et al. ............ 219/130.21
6,269,015 B1 * 7/2001 Ikeda et al. .................. 363/142
6,498,320 B1 * 12/2002 Moriguchi et al. ..... 219/130.21

FOREIGN PATENT DOCUMENTS

JP        05-277731        10/1993

* cited by examiner

Primary Examiner—Matthew V. Nguyen
(74) Attorney, Agent, or Firm—Duane Morris LLP

(57) ABSTRACT

An input rectifier of a power supply apparatus rectifies a selected one of two, higher and lower AC voltages applied to it. First and second inverters are connected in the output of the input rectifier. A high-frequency transformer is connected to the output of each of the first and second inverters. An output rectifier is connected to the output of each of the high-frequency transformers. When the higher one of the two AC input voltages is applied to the input rectifier, a switching circuit connects the first and second inverters in series between output terminals of the input rectifier. When the lower AC voltage is applied to the input rectifier, the switching circuit connects the first and second inverters in parallel between the output terminals of the input rectifier. When the first and second inverters are connected in series between the output terminals of the input rectifier, a voltage balancing control unit operates to suppress imbalance between input voltages to the first and second inverters.

7 Claims, 2 Drawing Sheets ized, light-weighted power supply apparatuses for arc-utilizing apparatuses are arranged such that an AC input voltage applied thereto is converted into a DC voltage by an input rectifier. The resultant DC voltage is then converted into a high-frequency voltage by an inverter. The high-frequency voltage is then voltage-transformed to a voltage having a desired value by a high-frequency transformer. The voltage-transformed high-frequency voltage is converted back into a DC voltage by an output rectifier, which DC voltage can be applied to a load. Japanese Patent Application Publication No. HEI 05-277731 A discloses an example of a power supply apparatus for arc-utilizing apparatuses, arranged based on the above-described power supply concept, which can operate from either one of two, higher and lower AC input voltages.

POWER SUPPLY APPARATUS FOR ARC-UTILIZING APPARATUS

This invention relates to a power supply apparatus for arc-utilizing apparatuses, such as an arc welder, an arc cutter, and an arch discharge lamp, and, more particularly, to such a power supply apparatus which can be operated from either one of two different valued voltages.

BACKGROUND OF THE INVENTION

Conventional small-sized, light-weighted power supply apparatuses for arc-utilizing apparatuses are arranged such that an AC input voltage applied thereto is converted into a DC voltage by an input rectifier. The resultant DC voltage is then converted into a high-frequency voltage by an inverter. The high-frequency voltage is then voltage-transformed to a voltage having a desired value by a high-frequency transformer. The voltage-transformed high-frequency voltage is converted back into a DC voltage by an output rectifier, which DC voltage can be applied to a load. Japanese Patent Application Publication No. HEI 05-277731 A discloses an example of a power supply apparatus for arc-utilizing apparatuses, arranged based on the above-described power supply concept, which can operate from either one of two, higher and lower AC input voltages.

The power supply apparatus disclosed in Japanese Patent Application Publication No. HEI 05-277731 A is provided with a pair of inverters. For a higher AC input voltage of, for example, 400 V, applied to the input of the power supply apparatus, the two inverters are connected in series in the output of the input rectifier. If a lower AC input voltage of, for example, 200 V, is used, the two inverters are connected in parallel with each other in the output of the input rectifier. In order to prevent input voltages as applied to the respective inverters, when connected in series, from being imbalanced, a tertiary winding is provided for a high-frequency transformer connected in the output of each inverter. In addition, a diode bridge is used to convert a high-frequency voltage induced in each tertiary winding into a DC voltage, which is fed back to the input side of the inverters. More specifically, the DC voltage resulting from the high-frequency voltage induced in the tertiary winding of a first high-frequency transformer is fed back to the input of the inverter associated with a second high-frequency transformer, and the DC voltage resulting from the high-frequency voltage induced in the tertiary winding of the second high-frequency transformer is fed back to the input of the inverter associated with the first high-frequency transformer.

The power supply apparatus disclosed in this Japanese patent application publication requires tertiary windings in the high-frequency transformers, and diode bridges in association with the respective tertiary windings, which impedes reduction of size and weight of power supply apparatuses of this type.

An object of the present invention is to provide a power supply apparatus for an arc-utilizing apparatus, which can be small in size and light in weight.

SUMMARY OF THE INVENTION

According to a first embodiment of the present invention, a power supply apparatus for an arc-utilizing apparatus includes an input rectifier for rectifying either one of two, higher and lower AC input voltages applied to its input. First and second inverters are connected in the output of the input rectifier. A high-frequency transformer is connected in the output of each of the first and second inverters. An output rectifier is connected in the output of each of the high-frequency transformers. A switching circuit operates to connect the first and second inverters in series with each other between output terminals of the input rectifier when the higher one of the two AC input voltages is applied to the input rectifier, and operates to connect the first and second inverters in parallel between the output terminals of the input rectifier when the lower one of the two AC input voltages is applied to the input rectifier. Voltage balancing control means operates to suppress imbalance between the input voltages as applied to the first and second inverters when the switching circuit is operating to connect the first and second inverters in series between the output terminals of the input rectifier.

The voltage balancing control means may include a first capacitor connected in parallel between the input terminals of the first inverter, and a second capacitor connected in parallel between the input terminals of the second inverter. A first conduction path of a first semiconductor switching device is connected in parallel with the first capacitor. The first semiconductor switching device has a first control electrode for controlling the conduction state of the first conduction path. A second conduction path of a second semiconductor switching device is connected in parallel with the second capacitor. The second semiconductor switching device has a second control electrode for controlling the conduction state of the second conduction path. A first drive circuit is connected to the first control electrode for changing the conduction state of the first conduction path. A second drive circuit is connected to the second control electrode for changing the conduction state of the second conduction path. A control circuit is connected between a node at which a voltage having a magnitude of a half of the output voltage of the input rectifier is developed, and a junction of the first and second capacitors connected in series. The control circuit detects imbalance between the input voltages to the first and second inverters, and controls the first and second drive circuits in accordance with the amount of the detected imbalance in input voltage.

The control circuit may be arranged to make the first drive circuit render the first semiconductor switching device conductive when the input voltage to the first inverter is higher than the input voltage to the second inverter, and make the second drive circuit render the second semiconductor switching device conductive when the input voltage to the second inverter is higher than the first inverter.

Also, the first and second drive circuits may include light-receiving devices of first and second photocouplers, respectively. The light-emitting devices of the first and second photocouplers are included in the control circuit.

The light-receiving device of the first photocoupler may have a resistance variable in accordance with the amount of light emitted by the light-emitting device of the first photocoupler, and the conduction of the first semiconductor switching device is varied in accordance with the variable resistance of the light-receiving device of the first photocoupler. In this case, the light-emitting device of the first photocoupler emits light when the input voltage to the first inverter is higher than the input voltage to the second inverter. The light-receiving device of the second photocoupler may have a resistance variable in accordance with the amount of light emitted by the light-emitting device of the second photocoupler, and the conduction of the second semiconductor switching device is varied in accordance with the variable resistance of the light-receiving device of the second photocoupler. The light-emitting device of the second photocoupler emits light when the input voltage to the second inverter is higher than the input voltage to the first inverter.

The first and second semiconductor devices may be part of the first and second inverters, respectively.

According to a second embodiment of the present invention, a power supply apparatus for an arc-utilizing apparatus includes an input rectifier for rectifying an AC voltage applied to its input. First and second inverters are connected in series between the output terminals of the input rectifier. A high-frequency transformer is connected to the output of each of the first and second inverters, and an output rectifier is connected to the output of each high-frequency transformer. Voltage balancing control means operates to suppress imbalance between input voltages applied to the first and second inverters. The voltage balancing control means includes two resistors having the same resistance connected in series between the output terminals of the input rectifier. A first capacitor is connected between the input terminals of the first inverter, and a second capacitor is connected between the input terminal of the second inverter. A first semiconductor switching device is connected in parallel with the first capacitor, and a second semiconductor switching device is connected in parallel with the second capacitor. First and second photocouplers each having a light-emitting device and a light-receiving device are provided. The light-emitting device of the first photocoupler is connected between the junction of the two resistors and the junction of the first and second capacitors, and emits light when the voltage across the first capacitor is higher than the voltage across the second capacitor. The light-emitting device of the second photocoupler is connected between the junction of the two resistors and the junction of the first and second capacitors, and emits light when the voltage across the second capacitor is higher than the voltage across the first capacitor. The light-receiving device of the first photocoupler is so connected to the first semiconductor switching device as to render the first semiconductor switching device conductive when the light-emitting device of the first photocoupler is emitting light. The light-receiving device of the second photocoupler is so connected to the second semiconductor switching device as to render the second semiconductor switching device conductive when the light-emitting device of the second photocoupler is emitting light.

The first and second semiconductor switching devices may be part of the first and second inverters, respectively.

DESCRIPTION OF EMBODIMENTS

Figure 1:
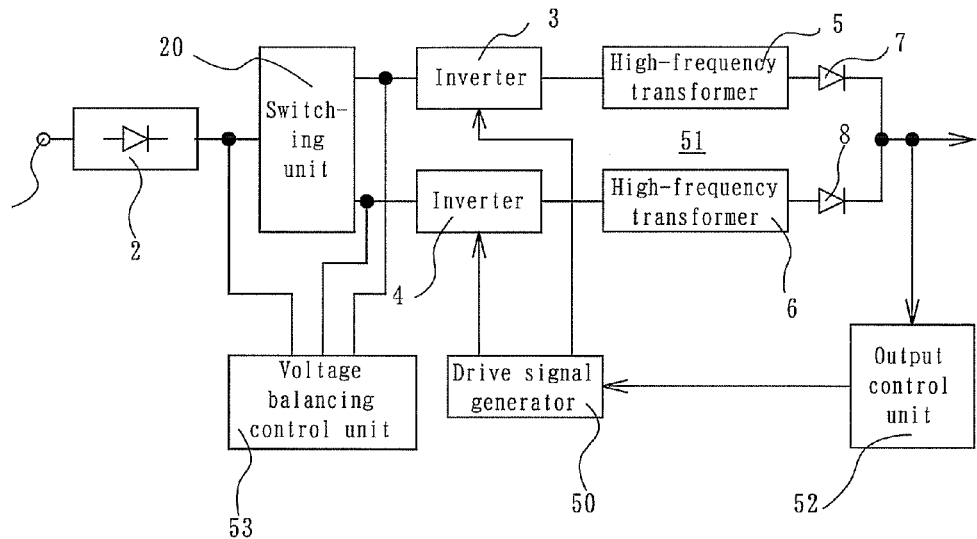
FIG. 1 is a block circuit diagram of a power supply apparatus according to the present invention.

A power supply apparatus for use with an arc-utilizing apparatus according to one embodiment of the present invention is shown in FIG. 1, and includes an input rectifier 2, which converts an AC input voltage applied to an AC input terminal 1 into a DC voltage. Inverters 3 and 4 are connected in the output side of the input rectifier 2 via a switching unit 20, which is described in greater detail later. A DC voltage from the input rectifier 2 is converted into a high-frequency voltage in each of the inverters 3 and 4. The output high-frequency voltages from the inverters 3 and 4 are voltage-transformed to voltages having a predetermined value in high-frequency transformers 5 and 6, respectively. The high-frequency voltages are rectified by output rectifiers 7 and 8 for application to a load (not shown).

A selected one of two different valued AC voltages is applied to the AC input terminal 1. A first one of the two AC input voltages is a lower voltage of, for example, about 200 V, and a second voltage is a higher voltage of, for example, about 400 V. When the lower voltage is applied to the input terminal 1, the switching unit 20 connects the inverters 3 and 4 in parallel with each other between the output terminals of the input rectifier 2. When the higher voltage is applied to the input terminal 1, the switching unit 20 connects the inverters 3 and 4 in series with each other between the output terminals of the input rectifier 2.

The inverters 3 and 4 are controlled in response to control signals applied to them by a drive signal generator 50, which generates the control signals in response to a signal applied thereto from an output control unit 52. The output control unit 52 detects a voltage being applied to a load (not shown) and makes the drive signal generator 50 generate the control signals such as to make the voltage applied to the load have a predetermined value. Alternatively, the output control unit 52 may be arranged to detect a current supplied to the load and make the drive signal generator 50 generate the control signals such as to make the current supplied to the load have a predetermined value.

Figure 2:
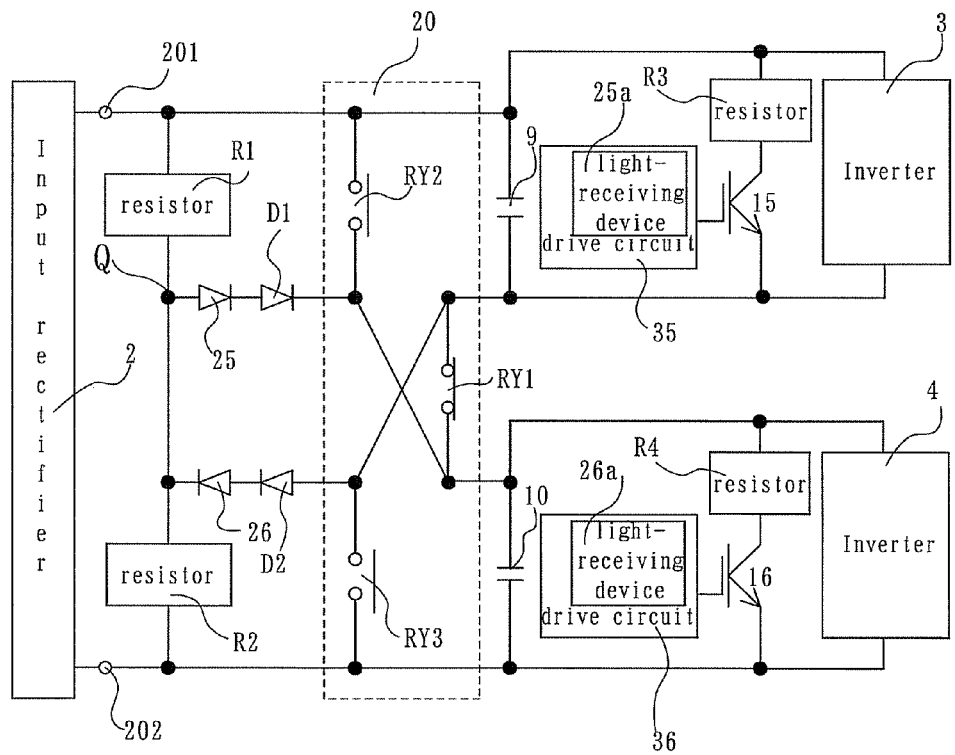
FIG. 2 is a circuit diagram showing details of an output control unit used in the power supply apparatus shown in FIG. 1.

Referring now to FIG. 2, smoothing capacitors 9 and 10 are connected between the input terminals of the inverters 3 and 4, respectively. Between a negative plate terminal of the capacitor 9 and a positive plate terminal of the capacitor 10, connected is a relay contact RY1, which forms part of the switching unit 20. Another relay contact RY2, which forms part of the switching unit 20, is connected between an output terminal 201 of the input rectifier 2 and the positive plate terminal of the capacitor 10. Similarly, another replay contact RY2, which forms part of the switching unit 20, is connected between an output terminal 202 of the input rectifier 2 and the negative plate terminal of the capacitor 9. (The output terminal 201 of the input rectifier 2 is more positive than the output terminal 202, and, therefore, the output terminals 201 and 202 may referred to as positive and negative output terminals 201 and 202, respectively, in this specification.) The relay contact RY1 is closed when no current flows in a relay circuit (not shown) with which it is associated, and is open when current flows in the relay circuit. The relay contacts RY2 and RY3 are open when no current is flowing through the relay circuit, and is closed when current flows through the relay circuit. It is so arranged that, when the lower AC voltage is being applied to the AC input terminal 1 (FIG. 1), no current flows through the relay circuit, and that, when the higher AC input voltage is at the AC input terminal 1, current flows through the relay circuit.

The capacitances of the capacitors 9 and 10 are equal so that equal voltages can be applied to them when the inverters 3 and 4 are connected in series. However, depending on the magnitude of the load current, the voltage across either of the capacitors 9 and 10 would decrease, causing imbalance between the input voltages to the inverters 3 and 4. Such voltage imbalance could cause a semiconductor switching device of the inverter receiving a higher input voltage to bear an excessive current. At the worst, that semiconductor switching device may be damaged by heat. A voltage balancing control unit 53 is used to prevent such accident.

As shown in FIG. 2, the voltage balancing control unit 53 includes a voltage divider, which includes two resistors R1 and R2 connected in series between the output terminals 201 and 202 of the input rectifier 2. The resistances of the resistors R1 and R2 are equal to each other. Accordingly, the voltage at an output terminal Q of the voltage divider at the junction of the resistors R1 and R2 relative to the voltage at the negative output terminal 202 is half the output voltage between the output terminals 201 and 202 of the input rectifier 2. A series combination of a light-emitting device, which may be a light-emitting device 25 of a photocoupler, and a diode D1 is connected between the output terminal Q and the positive plate terminal of the capacitor 10. The series combination is arranged such that, when the voltage at the output terminal Q is higher than the voltage at the positive plate terminal of the capacitor 10, current flows through the light-emitting device 25 to cause it to emit light. Similarly, a series combination of another light-emitting device, which may be a light-emitting device 26 of a photocoupler, and a diode D2 is connected between the output terminal Q and the negative plate terminal of the capacitor 9. The series combination of the light-emitting device 26 and the diode D2 is arranged such that, when the voltage at the negative plate terminal of the capacitor 9 is higher than the voltage at the output terminal Q, current flows through the light-emitting device 26 to cause it to emit light.

The relay contact RY1 is closed when the inverters 3 and 4 are connected in series, and, therefore, the voltage at the negative plate terminal of the capacitor 9 is equal to the voltage at the positive plate terminal of the capacitor 10. Accordingly, when the voltage across the smoothing capacitor 10 becomes higher than the voltage across the smoothing capacitor 9, with the inverters 3 and 4 connected in series, the light-emitting device 26 emits light. Conversely, when the voltage across the smoothing capacitor 10 becomes lower than the voltage across the smoothing capacitor 9, the light-emitting device 25 emits light.

A series combination of a resistor R3 and a semiconductor switching device, e.g. an IGBT 15, is connected in parallel with the smoothing capacitor 9. The IGBT 15 has its collector-emitter conduction path connected in series with the resistor R3. The IGBT 15 has a control electrode, e.g. a gate electrode, to which a drive circuit 35 is connected. The drive circuit 35 includes a light-receiving device 25a, which forms the photocoupler with the light-emitting device 25. Similarly, a series combination of a resistor R4 and a semiconductor switching device, e.g. an IGBT 16, is connected in parallel with the smoothing capacitor 10. The IGBT 16 has its collector-emitter conduction path connected in series with the resistor R4. The IGBT 16 has a control electrode, e.g. a gate electrode, to which a drive circuit 36 is connected. The drive circuit 36 includes a light-receiving device 26a, which forms the photocoupler with the light-emitting device 26. The resistors R3 and R4 have the same resistance value.

The drive circuits 35 and 36 are each arranged such that, when the light-receiving device receives light from the associated light-emitting device, the resistance of the light-receiving device changes. As a result, the associated IGBT is rendered conductive.

Accordingly, when the voltage across the smoothing capacitor 10 increases above the voltage at the output terminal Q, causing the light-emitting device 26 to emit light, the IGBT 16 becomes conductive, which results in discharging of the smoothing capacitor 10 via the resistor R4. This, in turn, causes the voltage across the capacitor 10 to decrease. When the voltage across the capacitor 9 becomes higher than the voltage across the capacitor 10, as a result of decreasing of the voltage across the capacitor 10, no current becomes to flow through the light-emitting device 26. This causes the light-emitting device 26 to stop emitting light, and the IGBT 16 is rendered nonconductive. At the same time, current flows from the output terminal Q to the positive plate terminal of the smoothing capacitor 10, causing the light-emitting device 25 to emit light, which results in rendering the IGBT 15 conductive. Then, the smoothing capacitor 9 discharges through the resistor R3, so that the voltage across the smoothing capacitor 9 decreases. When the voltage across the smoothing capacitor 10 becomes higher than the voltage across the capacitor 9, the light-emitting device 25 stops emitting light, whereas the light-emitting device 26 emits light. This renders the IGBT 16 conductive, resulting in decreasing of the voltage across the smoothing capacitor 10. In this manner, the imbalance between the voltages across the capacitors 9 and 10 is confined within a range.

With the above-described arrangement of the power supply apparatus, no additional windings need be provided on the transformers 5 and 6 in the outputs of the inverters 3 and 4, respectively, in order to balance the voltages across the capacitors 9 and 10, which are applied as the input voltages to the inverters 3 and 4. Thus, the power supply apparatus can be smaller in size and lighter in weight.

In the above-described arrangement of the power supply apparatus, the voltages across the capacitors 9 and 10 are balanced by means of the IGBTs 15 and 16 connected in parallel with the capacitors 9 and 10, respectively. A power supply apparatus according to a second embodiment of the invention shown in FIG. 3 uses semiconductor switching devices used in the inverters 3 and 4, e.g. IGBTs 11, 12, 13 and 14, to make the voltages across the capacitors 9 and 10 substantially equal.

Figure 3:
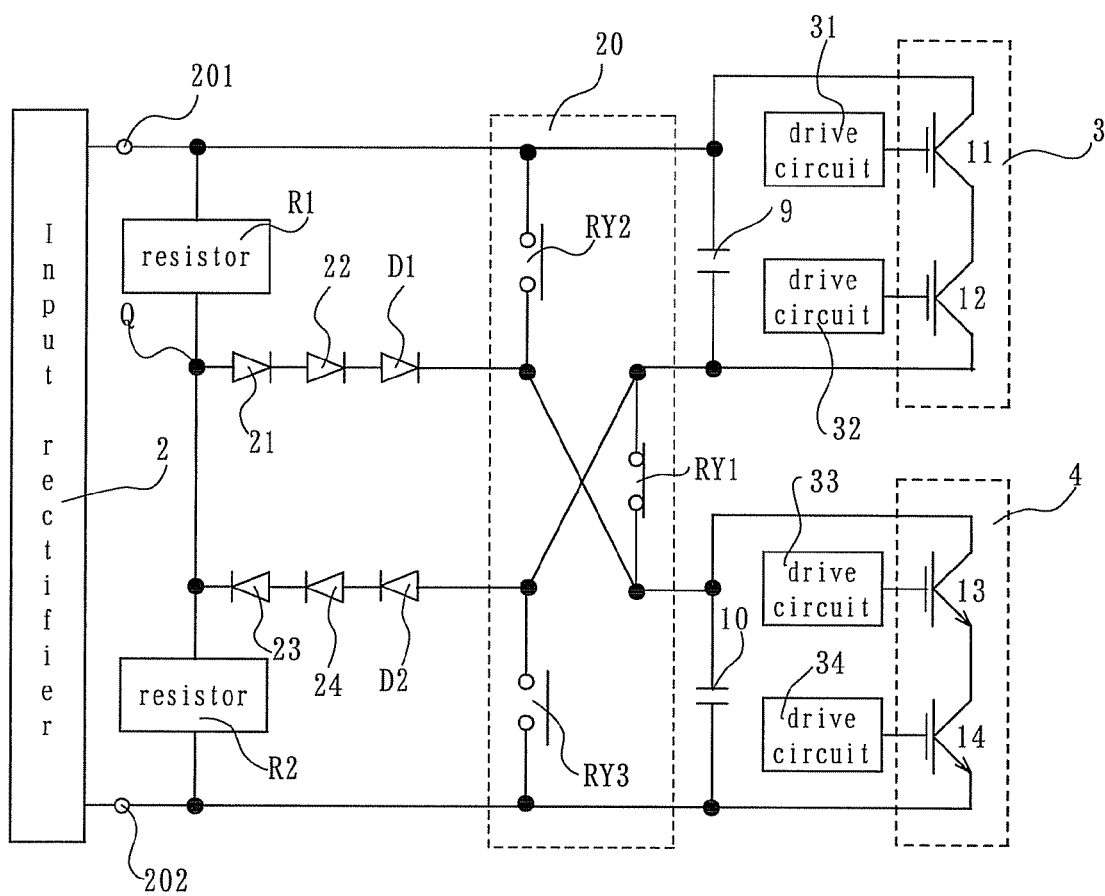
FIG. 3 is a circuit diagram showing a modification of the output control unit shown in FIG. 2.

As shown in FIG. 3, a series combination of two photocoupler light-emitting devices 21 and 22 and the diode D1 is connected between the output terminal Q of the voltage divider and the positive plate terminal of the smoothing capacitor 10. This connection is such that, when the voltage at the output terminal Q is higher than the voltage at the positive plate terminal of the capacitor 10, the light-emitting devices 21 and 22 emit light. Similarly, a series combination of two photocoupler light-emitting devices 23 and 24 and the diode D2 is connected between the output terminal Q and the negative plate terminal of the smoothing capacitor 9. This connection is such that, when the voltage at the negative plate terminal of the capacitor 9 is higher than the voltage at the output terminal Q, the light-emitting devices 23 and 24 emit light.

A drive circuit 31 including a light-receiving device of the photocoupler to which the light-emitting device 21 belongs, is connected to one of the semiconductor switching devices of the inverter 3. In the illustrated example, the drive circuit 31 is connected to the gate of the IGBT 11. When the light-emitting device 21 emits light, the IGBT 11 is rendered conductive. Similarly, a drive circuit 32 including a light-receiving device of the photocoupler to which the light-emitting device 22 belongs, is connected to the other of the semiconductor switching devices of the inverter 3. In the illustrated example, the drive circuit 32 is connected to the gate of the IGBT 12. When the light-emitting device 22 emits light, the IGBT 12 is rendered conductive. The collector-emitter conduction paths of the IGBTs 11 and 12 are connected in series, and this series combination is connected across the capacitor 9.

Similarly, a drive circuit 33 including a light-receiving device of the photocoupler to which the light-emitting device 23 belongs, is connected to one of the semiconductor switching devices of the inverter 4. In the illustrated example, the drive circuit 33 is connected to the gate of the IGBT 13. When the light-emitting device 23 emits light, the IGBT 13 is rendered conductive. Similarly, a drive circuit 34 including a light-receiving device of the photocoupler to which the light-emitting device 24 belongs, is connected to the other of the semiconductor switching devices of the inverter 4. In the illustrated example, the drive circuit 34 is connected to the gate of the IGBT 14. When the light-emitting device 24 emits light, the IGBT 14 is rendered conductive. The collector-emitter conduction paths of the IGBTs 13 and 14 are connected in series, and this series combination is connected across the capacitor 10.

The drive signal generator 50 provide control signals to the drive circuits 31, 32, 33 and 34, and when the control signal is applied to the drive circuit 31, 32, 33 or 34, the IGBT 11, 12, 13 or 14 associated with the drive circuit receiving the control signal is rendered conductive.

As in the power supply apparatus according to the first embodiment, in the power supply apparatus of the second embodiment, when the voltage across the smoothing capacitor 10 becomes higher than the voltage across the smoothing capacitor 9, with the inverters 3 and 4 connected in series with each other, the light-emitting devices 23 and 24 emit light to render the IGBTs 13 and 14 conductive, which results in decreasing of the voltage across the capacitor 10. When the voltage across the capacitor 10 becomes lower than the voltage across the capacitor 9, the light-emitting devices 23 and 24 stop emitting light, and the light-emitting devices 21 and 22 are made to emit light, rendering the IGBTs 11 and 12 conductive. This, in turn, causes the voltage across the capacitor 9 to decrease. In this manner, the imbalance between the voltages across the capacitors 9 and 10 is confined within a given range.

With this arrangement according to the second embodiment, the IGBTs forming part of the inverters 3 and 4 can be used as the IGBTs for making the voltages across the capacitors 9 and 10 substantially balanced. Therefore, the power supply apparatus can be manufactured at a lower cost.

What is claimed is:

1. A power supply apparatus for an arc-utilizing apparatus, comprising:
    an input rectifier for rectifying an AC voltage applied to an input terminal thereof, said AC voltage being one of higher and lower two AC voltages;
    first and second inverters connected in an output of said input rectifier;
    high-frequency transformers connected to outputs of respective ones of said first and second inverters;
    output rectifiers connected to respective ones of outputs of said high-frequency transformers;
    a switching circuit operating to connect said first and second inverters in series with each other in the output of said input rectifier when said higher AC voltage is applied to said input terminal of said input rectifier, and operating to connect said first and second inverters in parallel with each other in the output of said input rectifier when said lower AC voltage is applied to said input terminal of said input rectifier, whereby a predetermined DC voltage is applied to inputs of said first and second inverters; and
    voltage balancing control means for suppressing imbalance between the input voltages applied to said first and second inverters when said first and second inverters are connected in series with each other in the output of said input rectifier, wherein said voltage balancing control means comprises:
    a first capacitor connected in the input of said first inverter and in parallel with said first inverter;
    a second capacitor connected in the input of said second inverter and in parallel with said second inverter;
    a first semiconductor switching device having a first conduction path connected in parallel with said first capacitor, said first semiconductor switching device having a first control electrode for controlling the conduction of said first conduction path;
    a second semiconductor switching device having a second conduction path connected in parallel with said second capacitor, said second semiconductor switching device having a second control electrode for controlling the conduction of said second conduction path;
    a first drive circuit connected to said first control electrode for changing the conduction of said first conduction path;
    a second drive circuit connected to said second control electrode for changing the conduction of said second conduction path; and
    a control circuit connected between a node at which a voltage having a magnitude half of an output voltage of said input rectifier is developed, and a junction of said first and second capacitors connected in series when said switching circuit connects said first and second inverters in series, said control circuit detecting imbalance between the input voltages to said first and second inverters connected in series, and controlling said first and second drive circuits in accordance with the detected imbalance.

2. The power supply apparatus according to claim 1 wherein said control circuit causes said first drive circuit to render said first semiconductor switching device conductive when the input voltage to said first inverter is higher than the input voltage to said second inverter, and causes said second drive circuit to render said second semiconductor switching device conductive when the input voltage to said second inverter is higher than the input voltage to said first inverter.

3. The power supply apparatus according to claim 2 wherein said first and second drive circuit include light-receiving devices of first and second photocouplers, respectively; and said control circuit includes light-emitting devices of said first and second photocouplers.

4. The power supply apparatus according to claim 3 wherein:
    the light-receiving device of said first photocoupler changes a resistance thereof in accordance with the amount of light emitted by the light-emitting device of said first photocoupler, to thereby change the conduction state of said first semiconductor switching device, the light-emitting device of said first photocoupler emitting light when the input voltage to said first inverter is higher than the input voltage to said second inverter; and
    the light-receiving device of said second photocoupler changes a resistance thereof in accordance with the amount of light emitted by the light-emitting device of said second photocoupler, to thereby change the conduction state of said second semiconductor switching device, the light-emitting device of said second photocoupler emitting light when the input voltage to said second inverter is higher than the input voltage to said first inverter.

5. The power supply apparatus according to claim 1 wherein said first and second semiconductor switching devices form part of said first and second inverters, respectively.

6. A power supply apparatus for an arc-utilizing apparatus, comprising:
an input rectifier for rectifying an AC voltage applied to an input terminal thereof;
first and second inverters connected in series between output terminals of said input rectifier;
high-frequency transformers connected to outputs of respective ones of said first and second inverters;
output rectifiers connected to outputs of respective ones of said high-frequency transformers; and
voltage balancing control means for suppressing imbalance between the input voltages applied to said first and second inverters;
wherein said voltage balancing control means comprises:
two resistors having an equal resistance connected in series between said output terminals of said input rectifier;
a first capacitor connected between input terminals of said first inverter;
a second capacitor connected between input terminals of said second inverter;
a first semiconductor switching device connected in parallel with said first capacitor;
a second semiconductor switching device connected in parallel with said second capacitor;
a first photocoupler comprising a light-emitting device and a light-receiving device, said light-emitting device of said first photocoupler being connected between a node between said two resistors connected in series, and a node between said first and second capacitors, and emitting light when a voltage across said first capacitor is higher than a voltage across said second capacitor;
a second photocoupler comprising a light-emitting device and a light-receiving device, said light-emitting device of said second photocoupler being connected between said node between said two resistors connected in series, and said node between said first and second capacitors, and emitting light when the voltage across said second capacitor is higher than the voltage across said first capacitor;
the light-receiving device of said first photocoupler being connected to said first semiconductor switching device in such a manner that said first semiconductor switching device is rendered conductive when the light-emitting device of said first photocoupler is emitting light, the light-receiving device of said second photocoupler being connected to said second semiconductor switching device in such a manner that said second semiconductor switching device is rendered conductive when the light-emitting device of said second photocoupler is emitting light.

7. The power supply apparatus according to claim 6 wherein said first and second semiconductor switching devices form part of said first and second inverters, respectively.

* * * * *